Figure 1:
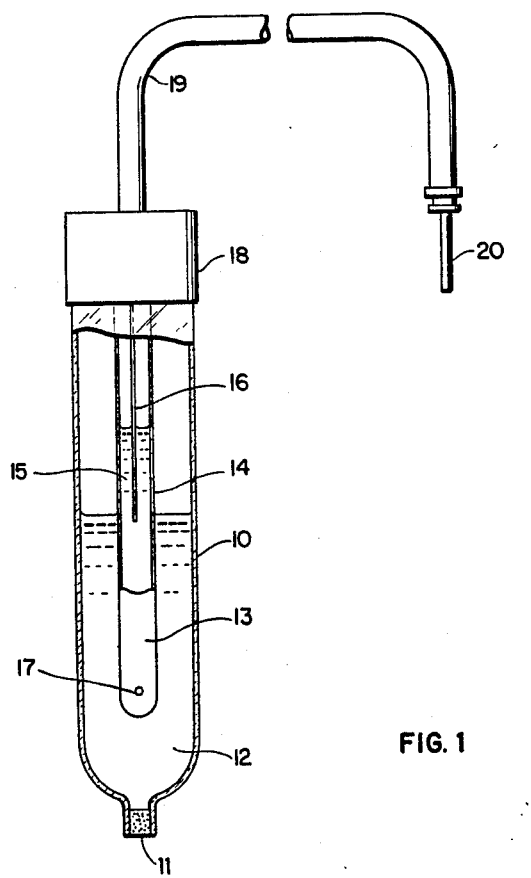

Aug. 16, 1966   E. P. ARTHUR   3,267,016
LEAK STRUCTURE AND METHOD FOR PRODUCING SAME
Filed Dec. 26, 1963

INVENTOR.
EDWIN P. ARTHUR
BY
ATTORNEY

United States Patent Office 3,267,016
Patented August 16, 1966

3,267,016
LEAK STRUCTURE AND METHOD FOR
PRODUCING SAME
Edwin P. Arthur, Fullerton, Calif., assignor to Beckman
Instruments, Inc., a corporation of California
Filed Dec. 26, 1963, Ser. No. 333,424
10 Claims. (Cl. 204—195)

This invention relates generally to an article incorporating minute passages between spaced zones and the method for making such an article and, in particular, to a leak structure for a liquid junction of a salt bridge tube such as is used in reference electrodes for ion potential measurements in solutions and the method for making the same.

In electrochemical measurements a reference electrode is commonly employed in conjunction with a measuring electrode, such as a glass electrode, with both electrodes immersed in a solution, whereby the potential difference between the two electrodes is a function of the concentration of a specific ion in the solution. A typical example is the conventional pH meter and electrode pair used for measuring hydrogen ion concentration in solutions.

A reference electrode ordinarily comprises an internal half cell structure supported within a tube containing a salt solution, the tube of salt solution being known as a salt bridge. Electrical connection between the salt solution and the sample or test solution is made by liquid contact via a suitably formed aperture or passage in the tube, generally referred to as a leak structure. Sometimes the entire unit consisting of the internal half cell structure, the tube, the salt solution and the leak structure is referred to as a half cell; however, for the present specification, the entire unit will be referred to as a reference electrode.

Various means have been utilized for forming the leak structure of a salt bridge tube, including agar gel connections, wicking, asbestos fibers, small capillary tubes, glass tubes with cracks therein, and annular spaces about metal rods molded in openings in the glass tubes. Also, the use of porous sintered plugs as leak structures is known. Such structures are made by providing a mixture of particles of glass and inert material, plugging an opening in a salt bridge tube with the mixture and sintering the mixture in situ by heating the mixture to a temperature within the working temperature range of the glass particles and the salt bridge tube. Such a leak structure is disclosed in Patent No. 2,925,370, to Rohrer entitled "Electrochemical Leak Structure and Method for Producing Same." Some of the prior art leak structures mentioned above have the disadvantage that they involve slow and costly methods of fabrication and produce undesirably large flow of the salt solution or flow at insufficient velocity to maintain the passage or passages clear of contaminating substances. Also, some of the leak structures fail to give the reproducible potentials needed for accurate measurements. Furthermore, and of great importance, many of the prior art leak structures are not capable of being produced in mass production with a high degree of uniformity in the leak rate characteristics or porosity of the structures.

Accordingly, it is the principal object of the present invention to provide a leak structure for a reference electrode or the like which produces potentials which are substantially independent of the character of the test solution, provide a desirable flow of salt solution therethrough and are not readily clogged.

Another object of the invention is to provide a leak structure which requires a minimum amount of skill to produce.

Another object of the invention is to provide a leak structure which may be made in mass production with a minimum amount of variation in the porosity of the leak structures and may be easily and inexpensively manufactured without requiring the heating of the leak structure to the working temperature range of the salt bridge tube.

According to the principal aspect of the present invention, a leak structure is formed for a salt bridge tube of a reference electrode or the like by providing a wall of nonconductive material with an opening therein and by plugging the wall with a hydrated concrete. Unlike the method described in the aforementioned patent to Rohrer, the plug of cement need not be heated to a sintering temperature but merely permitted to set to provide a leak structure in the salt bridge tube. After the concrete has set, it is warmed to a sufficient temperature to remove the superficial water in the concrete. Thereafter, in order to prepare the leak structure for use in a reference electrode, the superficial water removed from the concrete is replaced by electrolyte salt solution. Such a leak structure provides an optimum compromise between the characteristics of electrical resistance, flow rate, practical mechanical geometry, economy of fabrication, chemical durability and freedom from aberations. Most importantly, however, the leak structure may be produced without requiring a high degree of skill and may be manufactured in mass production with a high degree of uniformity of leak rate characteristics. Such mass production of uniform plugs or leak structures is provided since the plugs are formed "cold" in contrast to sintered plugs whose porosity is determined by the time-temperature cycle that is required to sinter the plugs. The actual sintering is difficult to control and often results in plugs having different degrees of porosity.

Figure 2:
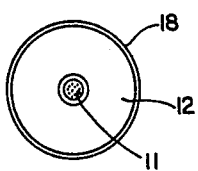

Other objects, aspects and advantages will become apparent from the following description taken in connection with the accompanying drawing wherein FIG. 1 is a side view, partly in section, showing a reference electrode incorporating the leak structure of the invention; and FIG. 2 is a view looking at the end of the reference electrode incorporating the leak structure of the present invention.

The leak structure is described herein as used with a typical reference electrode for a pH meter. The reference electrode comprises a tube 10 which is constricted at its lower end and has sealed therein a plug 11. It is understood, however, that the plug may be provided in an opening in the side of the tube, if desired. The tube contains a salt solution 12 and an internal half cell 13 is positioned within the tube and is partially immersed in the salt solution. The particular half cell illustrated herein is a silver-silver chloride half cell and comprises a tube 14 with a silver chloride solution 15 and a silver wire 16 coated with silver chloride dipping into the solution 15. A small opening 17 is provided in the tube 14 for fluid communication with the solution 12. The electrode structure is closed with a cap 18 and a cable 19 provides an electrical connection between the wire 16 and the connector 20.

The novel plug 11 of the present invention is formed of a hydrated concrete. The concrete plug 11 is formed by mixing a slurry or paste of water, cement and particles of an aggregate and by forcing the mixture into the opening in the end of the salt bridge tube 10. Thereafter, the mixture is allowed to set by leaving the tube 10 and plug 11 therein at room temperature for sufficient length of time. It is an important feature of the invention that the cement utilized in the concrete react with the water to form crystals which, when the concrete has set, are insoluble in water or aqueous salt solutions, and thus are essentially permanent. An example of such a cement is fine ground anhydrous tricalcium aluminate. As the aggregate, it has been found that finely divided silica or pulverized glass may be used. Thus, when the mixture is permitted to set in the open end of the glass tube 10, irreversible hydration takes place which results in the calcium aluminate forming crystals which are substantially insoluble in water or aqueous salt solutions. Obviously, if a cement is used which is not insoluble after hardening of the concrete, the salt solution flowing from the salt bridge tube 10 into a sample would be contaminated and the porosity of the plug would increase.

After the concrete plug 11 has set and crystallized in the end of the tube 10, the plug is warmed to a sufficient temperature to remove the superficial water from the plug. It is desirable not to heat the plug beyond the central annealing temperature range of the glass tube 10, which temperature is near 550° C. for borosilicate glass tubes. After the plug has been warmed to remove the superficial water, the water is replaced by a salt solution so that the plug will then be ready for use as a leak structure for the reference electrode. Thus, the electrolytic path of the concrete plug of the present invention is provided by removing the superficial water in the concrete and replacing it with salt solution. The salt solution may be incorporated in the plug by merely soaking the plug in a salt solution or, even by boiling the plug in a salt solution.

Generally speaking, the proportions of the water, tricalcium aluminate cement and aggregate required to make the concrete plug of the present invention are not extremely critical. However, it has been found that a mixture having substantially equal amounts by weight of cement and aggregate and an amount of water sufficient to attain good plasticity is preferable. Generally, good plasticity requires that the water be about equal in weight to the weight of both the cement and aggregate.

By way of example, an excellent small diameter leak structure has been produced in a Pyrex salt bridge tube by mixing an equal amount by weight of ground lead bearing borosilicate glass and tricalcium aluminate. The particular glass which was used in the leak structure was made from a prefusion mixture of sand, lead borate, litharge in proportions by weight of 415, 900 and 1233, respectively. The glass and tricalcium aluminate were mixed with an equal amount by weight of water into a slurry and then introduced into the opening of a salt bridge tube. The mixture remained at rest in the tube at room temperature over a period of about ten hours during which time irreversible hydration took place whereby the tricalcium aluminate formed into insoluble crystals. After the concrete set and crystallized it was warmed to remove the superficial water. Although the temperature needed only to be raised to about 115° C. to remove much of the superficial water, the temperature was actually raised to the annealing temperature of the salt bridge tube, which was approximately 555° C. for the Pyrex salt bridge tube. After the annealing, the plug was soaked in a 4 Normal potassium chloride solution. Thereafter, a reference electrode as shown in FIG. 1 was constructed from the glass tube and concrete plug. The plug had a diameter of about .5 millimeter and was about 5 millimeters long. The D.C. resistance of the electrolytic path provided by the concrete leak structure when using a 4 Normal potassium chloride solution at 25° C. was near 7,500 ohms.

By way of a further example, a concrete plug was formed from approximately equal amounts by weight of tricalcium aluminate and finely ground silica. Water was added to the mixture in an amount about equal in weight to the weight of the tricalcium aluminate and silica, which amount is equal approximately to about 25% volume of the total mix. The mixture was forced into the opening in a Pyrex salt bridge tube and permitted to crystallize. Thereafter, the plug was warmed to remove the superficial water. As in the prior example, the superficial water was removed during the time of annealing thus resulting in a single step to provide these two functions. Thereafter, the concrete plug was soaked in potassium chloride solution to fill those areas in the concrete which previously held the superficial water. The plug formed had a diameter of about .4 millimeter and a length of 8 millimeters. The D.C. electrical resistance of the leak structure at 25° C. with 4 Normal potassium chloride solution was on the order of 10,000 ohms. The flow rate of salt solution under a 4 inch hydrostatic head through the leak structure was less than $\frac{1}{10}$ milliliter in 24 hours.

It can be appreciated that by forming a leak structure utilizing a hydrated concrete, the leak structure may be formed "cold" rather than requiring a critical heating of the mix forming the plug to a temperature the provides sintering as required in the aforementioned Rohrer patent. Thus, a close control of temperature is not required to form the leak structure of the present invention. In contrast, the sintering process described in the Rohrer patent requires extremely close temperature control to obtain leak structures of uniform porosity since differences in temperatures used can alter the amount of sintering and hence, the porosity of the plugs. Thus, this invention provides a method for producing by mass production techniques uniform leak structures which have the desired characteristics required for making electrochemical ion concentration measurements.

Although several embodiments of the invention have been disclosed herein for purposes of illustration, it will be understood that various changes can be made in the form, details, arrangement and proportions of the various parts in such embodiments without departing from the spirit and scope of the convention as defined by the appended claims.

What is claimed is:

1. A leak structure for a liquid junction of a salt bridge tube, the combination of:
   a wall of nonconductive material having an opening therein; and
   a porous plug in said opening formed of hydrated concrete, said concrete consisting essentially of hydrated tricalcium aluminate and particles of non-porous aggregate.

2. In a leak structure for a liquid junction of a salt bridge tube, the combination of:
   a wall of nonconductive material having an opening therein; and
   a porous plug in said opening formed of hydrated concrete substantially insoluble in aqueous salt solutions, said concrete consisting essentially of equal amounts by weight of particles of non-porous aggregate and hydrated tricalcium aluminate.

3. A leak structure as set forth in claim 1 wherein said aggregate is selected from the group consisting of glass and silica.

4. A leak structure as set forth in claim 3 wherein said glass is lead bearing borosilicate glass.

5. A method of making a leak structure for a liquid junction of a salt bridge tube, including the steps of:
   providing a wall of nonconducting material having an opening therein;
   providing a mixture consisting essentially of water, anhydrous tricalcium aluminate and particles of non-porous aggregate;
   plugging said opening with said mixture;
   allowing said mixture to set and thereby form a hydrated, porous concrete plug in said opening; and
   heating said plug to a temperature no greater than the annealing temperature of said wall to remove superficial water from said plug and thereby provide interstices in said plug through which salt solution may pass.

6. A method as set forth in claim 5 wherein said plug is heated to a sufficient temperature to anneal said wall.

7. A method as set forth in claim 5 including the additional step of filling the interstices in said plug with a salt solution.

8. A method as set forth in claim 5 wherein said aggregate is selected from the group consisting of glass and silica.

9. A method as set forth in claim 5 wherein said water in said mixture is substantially equal in weight to the weight of said tricalcium aluminate and said aggregate, and said tricalcium aluminate is substantially equal in weight to said aggregate.

10. A method of making a leak structure for a liquid junction of a salt bridge tube, including the steps of:
   providing a wall of nonconducting material having an opening therein;
   providing a mixture consisting essentially of water, anhydrous tricalcium aluminate and non-porous aggregate selected from the group consisting of particles of glass and silica;
   plugging said opening with said mixture;
   allowing said mixture to set and thereby form a hydrated, porous concrete plug in said opening;
   heating said plug to a temperature no greater than the annealing temperature of said wall to remove superficial water from said plug and thereby provide interstices in said plug through which salt solution may pass; and
filling the interstices in said plug with a salt solution.

References Cited by the Examiner

UNITED STATES PATENTS

| | | | |
|---|---|---|---|
| 548,162 | 10/1895 | Hargreaves et al. | 204—295 |
| 609,745 | 8/1898 | Luxton | 204—295 |
| 2,614,976 | 10/1952 | Patnode et al. | 204—195 |
| 2,925,370 | 2/1960 | Rohrer | 204—195 |
| 2,955,947 | 10/1960 | Gmeiner | 106—40 |

FOREIGN PATENTS

| | | |
|---|---|---|
| 678,648 | 9/1952 | Great Britain. |
| 40,206 | 11/1924 | Norway. |

OTHER REFERENCES

"The Chemistry of Cement and Concrete," Lea et al., 1956, Edward Arnold Ltd., London, pp. 283 and 284.

JOHN H. MACK, *Primary Examiner.*

T. TUNG, *Examiner.*